US012626848B2

(12) United States Patent
Boudreaux et al.

(10) Patent No.: US 12,626,848 B2
(45) Date of Patent: May 12, 2026

(54) MAGNETIC LATCHING CONNECTOR WITH ELECTRIC UNLATCH

(71) Applicant: Testron Corporation, Livonia, MI (US)

(72) Inventors: John Paul Boudreaux, Ypsilanti, MI (US); Brandon Dombrowski, Ferndale, MI (US)

(73) Assignee: Testron Corporation, Livonia, MI (US)

( * ) Notice: Subject to any disclaimer, the term of this patent is extended or adjusted under 35 U.S.C. 154(b) by 231 days.

(21) Appl. No.: 18/217,482

(22) Filed: Jun. 30, 2023

(65) Prior Publication Data

US 2024/0013962 A1 Jan. 11, 2024

Related U.S. Application Data

(60) Provisional application No. 63/359,054, filed on Jul. 7, 2022.

(51) Int. Cl.

| | |
|---|---|
| ***H01F 7/16*** | (2006.01) |
| ***H01F 7/122*** | (2006.01) |
| ***H01R 13/62*** | (2006.01) |
| ***H01R 13/627*** | (2006.01) |

(52) U.S. Cl.

CPC ........... *H01F 7/1615* (2013.01); *H01F 7/122* (2013.01); *H01F 7/1646* (2013.01); *H01R 13/6205* (2013.01); *H01R 13/6275* (2013.01)

(58) Field of Classification Search

None

See application file for complete search history.

(56) References Cited

U.S. PATENT DOCUMENTS

| | | | | |
|---|---|---|---|---|
| 6,244,889 | B1 * | 6/2001 | James | H01R 13/707 439/258 |
| 8,206,172 | B2 * | 6/2012 | Katagiri | B60L 50/16 439/352 |
| 9,531,127 | B2 * | 12/2016 | Yahagi | H01R 13/6275 |
| 9,806,459 | B2 * | 10/2017 | Fuehrer | H01R 13/6275 |
| 10,158,195 | B2 * | 12/2018 | McSweeney | A61M 60/178 |
| 11,581,681 | B2 * | 2/2023 | Nguyen | H01R 43/26 |
| 2024/0063574 | A1 * | 2/2024 | Simbürger | H01R 13/6273 |

* cited by examiner

*Primary Examiner* — Felix O Figueroa

(74) *Attorney, Agent, or Firm* — Barnes & Thornburg

(57) ABSTRACT

A connector system includes a connector base, a connector head, a latch, and a solenoid. The connector base and the connector head may be coupled together to establish an electrical connection therebetween. The connector base and connector head may be latched and unlatched using a combination of a magnet and the solenoid. The magnet facilitates latching and the solenoid facilitates unlatching of the connector head from the connector base.

18 Claims, 10 Drawing Sheets

MAGNETIC LATCHING CONNECTOR WITH ELECTRIC UNLATCH

CROSS-REFERENCE TO RELATED APPLICATIONS

This non-provisional application claims the benefit and priority, under 35 U.S.C. § 119(e) and any other applicable laws or statutes, to U.S. Provisional Patent Application Ser. No. 63/359,054 filed Jul. 7, 2022, the entire disclosure of which is hereby expressly incorporated herein by reference.

TECHNICAL FIELD

The present disclosure generally relates to systems and methods for electrical connectors.

BACKGROUND

Over the past several decades, the number of electrical components used in automobiles, and other on-road and off-road vehicles such as pick-up trucks, commercial vans and trucks, semi-trucks, motorcycles, all-terrain vehicles, and sports utility vehicles (collectively "motor vehicles") has increased dramatically. Electrical components are used in motor vehicles for a variety of reasons, including but not limited to, monitoring, improving and/or controlling vehicle performance, emissions, safety and creates comforts to the occupants of the motor vehicles. Considerable time, resources, and energy have been expended to develop power distribution components that meet the varied needs and complexities of the motor vehicle market; however, conventional power distribution components suffer from a variety of shortcomings.

Motor vehicles are challenging electrical environments for both the electrical components and the connector assemblies due to a number of conditions, including but not limited to, space constraints that make initial installation difficult, harsh operating conditions, large ambient temperature ranges, prolonged vibration, heat loads, and longevity, all of which can lead to component and/or connector failure. For example, incorrectly installed connectors, which typically occur in the assembly plant, and dislodged connectors, which typically occur in the field, are two significant failure modes for the electrical components and motor vehicles. Each of these failure modes leads to significant repair and warranty costs. In light of these challenging electrical environments, considerable time, money, and energy have been expended to find power distribution components that meet the needs of the markets.

SUMMARY

An electrical connector assembly includes a first electrical connector portion, a second electrical connector portion, a latch, a magnet, and a solenoid. The second electrical connector portion is configured to be selectively coupled to the first electrical connector portion to establish an electrical connection therebetween. The latch is pivotably coupled to the first electrical connector portion at a pivot point. The first electrical connector portion and the second electrical connector portion are in a locked state when the latch is pivotably positioned to engage at least a portion of the second electrical connector portion. When the latch is pivotably positioned to engage at least a portion of the second electrical connector portion, the latch is in a latched position. When the latch is pivotably positioned to not engage at least a portion of the second electrical connector portion, the latch is in an unlatched position. The first electrical connector portion and the second electrical connector portion are in an unlocked state when the latch is pivotably positioned not to engage at least a portion of the second electrical connector portion. The magnet is coupled to the first electrical connector portion and is configured to magnetically engage the latch to cause the latch to maintain a predefined position. The solenoid is configured to, in response to receiving an electrical control signal, actuate the latch by overcoming the magnetic attraction applied on the latch by the magnet to cause the first electrical connector portion and the second electrical connector portion to be in the unlocked state.

In some embodiments, the assembly further includes a first enclosure configured to house the first electrical connector portion and a second enclosure configured to house the second electrical connector portion. The second electrical connection portion can include a multi-pin electrical connector. The multi-pin electrical connector can be one of an on-board diagnostics (OBD) electrical connector, a vehicle seat sub-assembly electrical connector, a vehicle door sub-assembly electrical connector, an electrical connector for a motor, or an electrical connector for a sensor.

In some embodiments, the magnet is disposed within the first electrical connector portion. The solenoid can be an electrically actuated solenoid. The latch can be a metal lever. The magnet can be one of a neodymium magnet, a samarium cobalt magnet, an alnico magnet, or a ferrite magnet.

An electrical connector system includes a first electrical connector portion, a second electrical connector portion, a latch, a magnet, and a solenoid. The latch is configured to lockably join together the first electrical connector portion and the second electrical connector portion to complete an electric circuit therebetween. The magnet is configured to magnetically secure the latch in a predefined position. The solenoid is configured to, in response to receiving an electrical control signal, actuate the latch to overcome magnetic force of the magnet to cause the first electrical connector portion to uncouple from the second electrical connector portion.

In some embodiments, the latch is pivotably coupled to a pivot point of the first electrical connector portion and configured to pivot relative thereto. The magnet can be disposed within the first electrical connector portion. The magnet can be selected from a list including a neodymium magnet, a samarium cobalt magnet, an alnico magnet, or a ferrite magnet. The second electrical connection portion can include a multi-pin electrical connector. The multi-pin electrical connector can be one of an on-board diagnostics (OBD) electrical connector, a vehicle seat sub-assembly electrical connector, a vehicle door sub-assembly electrical connector, an electrical connector for a motor, or an electrical connector for a sensor An electrical connector assembly includes a first electrical connector portion, a second electrical connector portion, a magnet, and a solenoid. The second electrical connector portion is configured to be selectively coupled to the first electrical connector portion to establish an electrical connection therebetween. The first electrical connector portion and the second electrical connector portion are in a locked state when coupled together and in an unlocked state when not coupled together. The magnet is coupled to the first electrical connector portion and is configured to apply magnetic attraction to cause the first electrical connector portion and the second electrical connector portion to maintain the locked state. The solenoid is configured to, in response to receiving an electrical control signal, cause force to be applied to overcome the magnetic attraction applied by the magnet to cause the first electrical connector portion and the second electrical connector portion to be in the unlocked state.

In some embodiments, the assembly further includes a latch pivotably coupled to the first electrical connector portion at a pivot point of the first electrical connector portion. The magnet can be configured to magnetically engage the latch to cause the latch to maintain a predefined position. In some embodiments, the first electrical connector portion and the second electrical connector portion are in the locked state when the latch is in a latched position and is pivotably positioned to engage at least a portion of the second electrical connector portion, and in some embodiments, the first electrical connector portion and the second electrical connector portion are in an unlocked state when the latch is in an unlatched position and is pivotably positioned not to engage at least a portion of the second electrical connector portion.

In some embodiments, the solenoid is configured to, in response to receiving an electrical control signal, actuate the latch to overcome magnetic force of the magnet to cause the first electrical connector portion to uncouple from the second electrical connector portion. The magnet can include one of a neodymium magnet, a samarium cobalt magnet, an alnico magnet, or a ferrite magnet. The magnet can be disposed within the first electrical connector portion.

DETAILED DESCRIPTION

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

Figure 1:
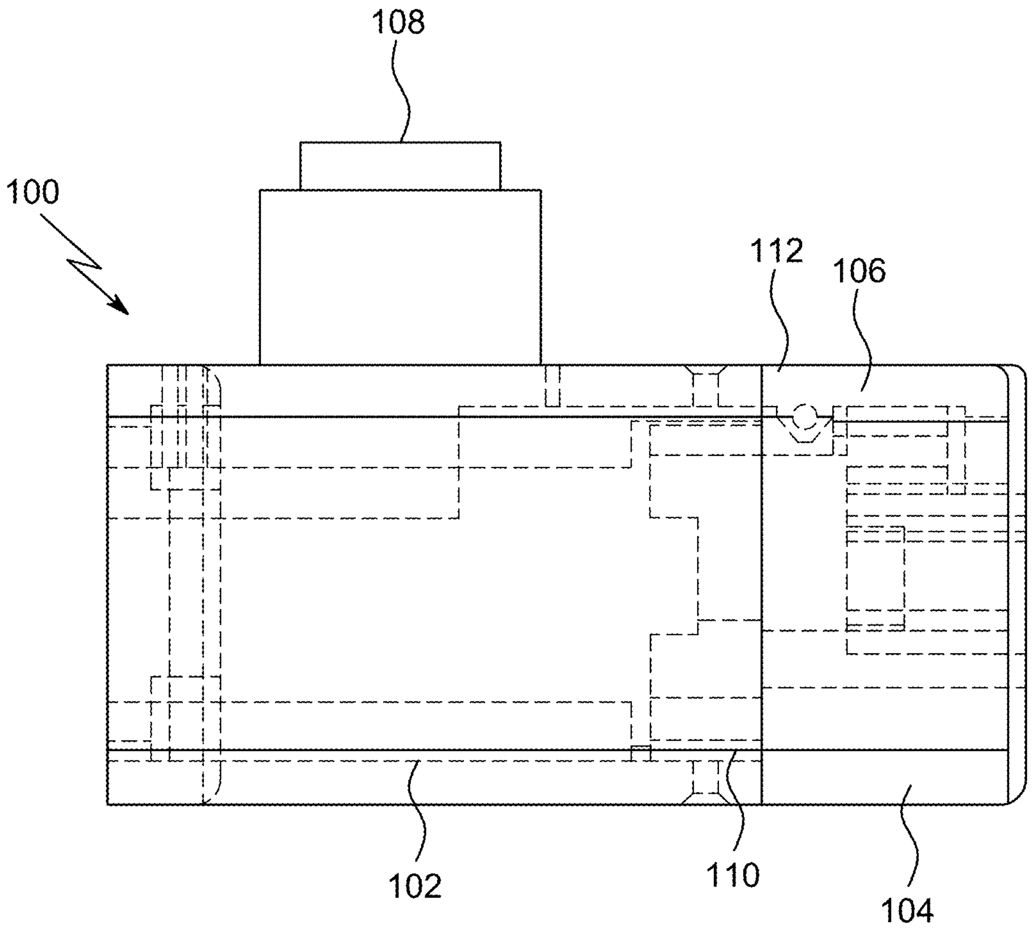
FIG. 1 is a side view of a connector system of the present disclosure in a first state.

FIG. 1 illustrates a side view of an exemplary embodiment of a connector system 100 in accordance with the present disclosure. The connector system 100 includes a connector base 102, a connector head 104, a latch 106, and a solenoid 108. In some instances, the connector base 102 may be an enclosure, such as, for example, a molded enclosure or a machined enclosure. The connector base 102 may house a first electrical connector end 110. In one example, the connector base 102 may be made of plastic or another polymer-based synthetic material that is moldable into a predefined shape. In such an example, the connector base 102 may be a plastic enclosure sized to house the first electrical connector end 110. In some embodiments, the connector base 102 may be a first electrical connector portion with a first housing or enclosure. In some embodiments, the connector head 104 may be a second electrical connector portion with a second housing or enclosure.

The connector head 104 houses a second electrical connector end 112. In some instances, the connector head 104 may be an enclosure, such as, for example, a molded enclosure or a machined enclosure. In one example, the connector base 102 may be made of plastic or another polymer-based synthetic material that is moldable into a predefined shape. In such an example, the connector head 104 may be a plastic enclosure sized to house the second electrical connector end 112.

The first electrical connector end 110 of the connector base 102 and the second electrical connector end 112 of the connector head 104 may be interconnected, or otherwise coupled, with one another to establish an electrical connection therebetween. As described in reference to at least FIGS. 2-4 and FIGS. 5A-5D, the latch 106, either alone or in combination with the solenoid 108, may be configured to lock together the first electrical connector end 110 of the connector base 102 and the second electrical connector end 112 of the connector head 104 to complete an electrical circuit and establish electrical connection therebetween.

Figure 2:
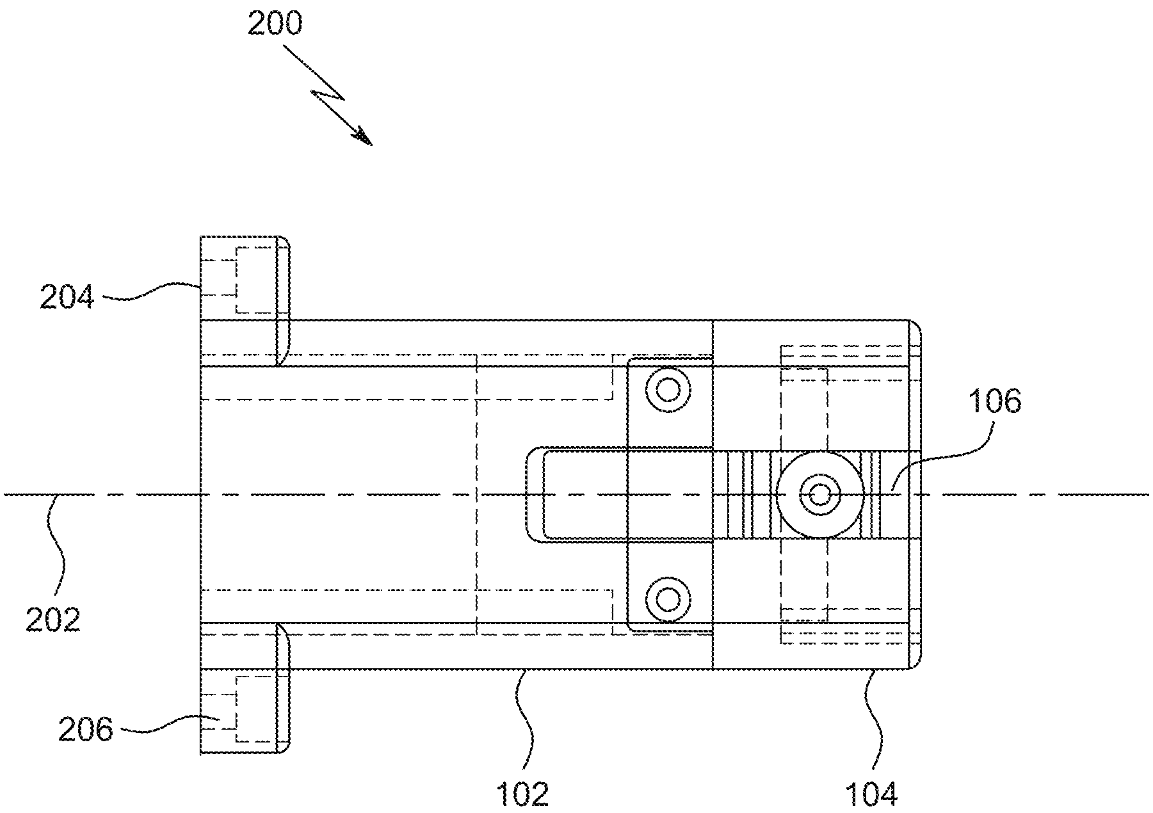
FIG. 2 is a top view of the connector system of FIG. 1 in a second state.

FIG. 2 illustrates a top view 200 of the connector system 100 in accordance with the present disclosure. In an example, the latch 106 may be disposed parallel to a central axis 202 of the connector base 102 and the connector head 104. In one example, the connector base 102 may include one or more mounting points 204, 206 configured to receive a fastener therethrough to enable securing the connector base 102 to a surface.

Figure 3:
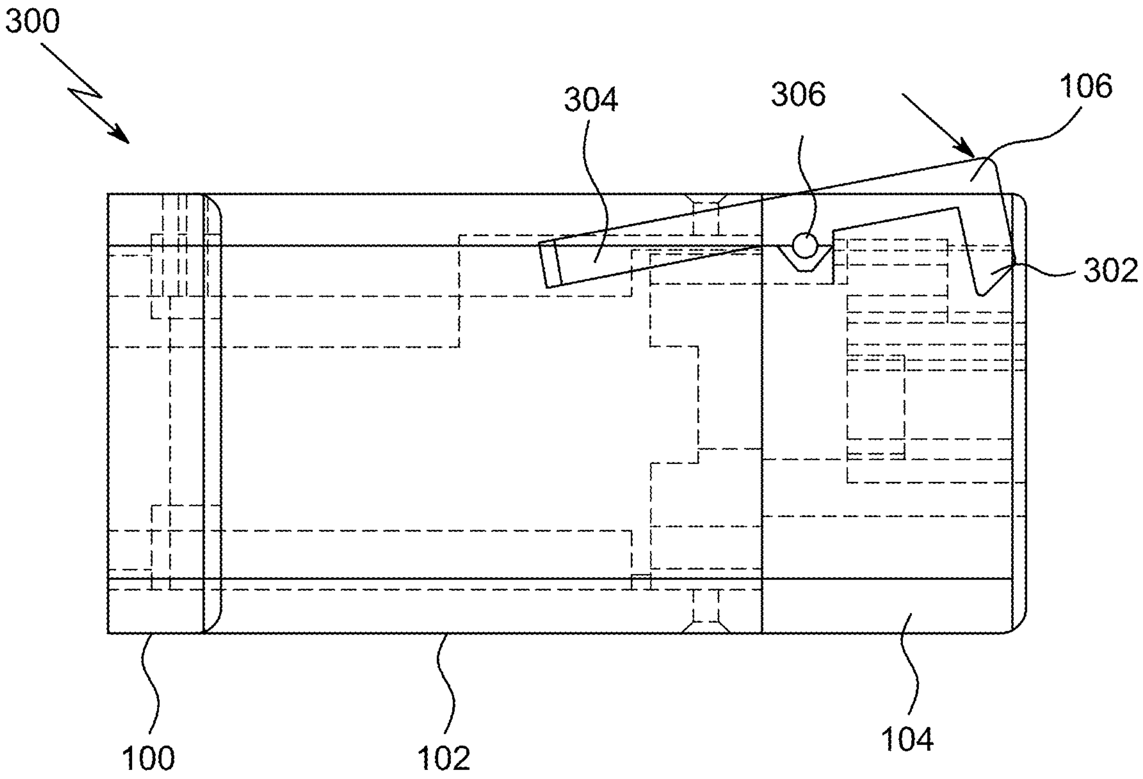
FIG. 3 is a side view of the connector system of FIG. 1 in a first state.

As described in reference to at least FIG. 3, the latch 106 may be configured to be in one of a first (or unlatched) position and a second (or latched) position. When in the first position, the latch 106 may be configured not to lock together the connector base 102 and the connector head 104. When in the second position, the latch 106 may be configured to lock together the connector base 102 and the connector head 104 by engaging at least a portion of the connector head 104. Accordingly, the connector system 100 may be in one of a first (or unlocked) state when the latch 106 is in the first position and a second (or locked) state when the latch 106 is in the second position. When the latch 106 is pivotably positioned to engage at least a portion of the second electrical connector portion (or connector head 104), the latch 106 is in a latched position. When the latch 106 is pivotably positioned to not engage at least a portion of the second electrical connector portion (or connector head 104), the latch 106 is in an unlatched position.

Figure 4A:
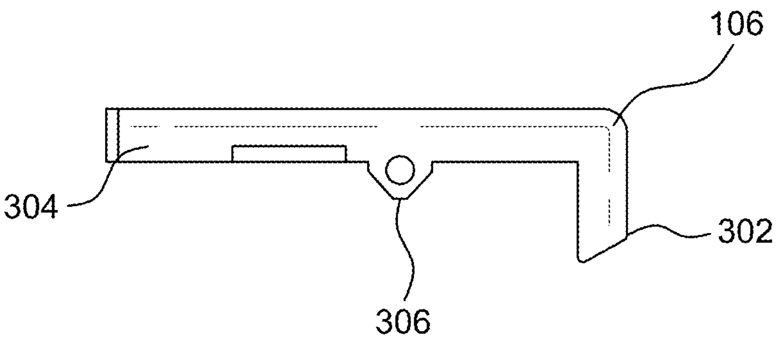
FIG. 4A is a side view of a latch.
Figure 4B:
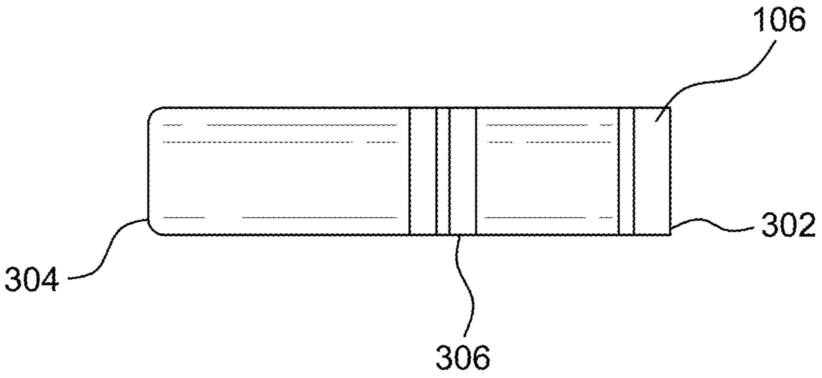
FIG. 4B is a top view of the latch of FIG. 4A.

FIG. 3 illustrates a side view 300 of the connector system 100. The latch 106 includes an engaging end 302 and a plunger end 304 disposed opposite the engaging end 302. The connector base 102 includes a pivot point 306. The latch 106 is pivotably coupled to the connector base 102 at the pivot point 306 via a coupling point 303 disposed between the engaging end 302 and the plunger end 304. FIGS. 4A and 4B illustrate an example implementation of the latch 106. FIG. 4A illustrates a side view of the latch 106 and FIG. 4B illustrates a top view of the latch 106. The engaging end 302 and the plunger end 304 of the latch 106 pivot, or otherwise flex, tilt, or rotate, relative to the pivot point 306. In one example, the latch 106 may be a metal lever. In another example, the material of the latch 106 is a ferromagnetic material. The latch 106 couples the connector base 102 to the connector head 104.

The first position of the latch 106 includes the engaging end 302 of the latch 106 being raised above the pivot point 306 of the connector head 104 and the plunger end 304 of the latch 106 being recessed into the connector base 102. The second position of the latch 106 includes both the engaging end 302 and the plunger end 304 of the latch 106 being disposed flush with a surface of the connector base 102. While the first position and the second position are described above using relative positions of both the engaging end 302 and the plunger end 304, the connector system 100 of the present disclosure is not so limited. In other instances, the latch 106 may be configured such that the first position and the second position include a position of only one of the engaging end 302 and the plunger end 304.

Figure 5:
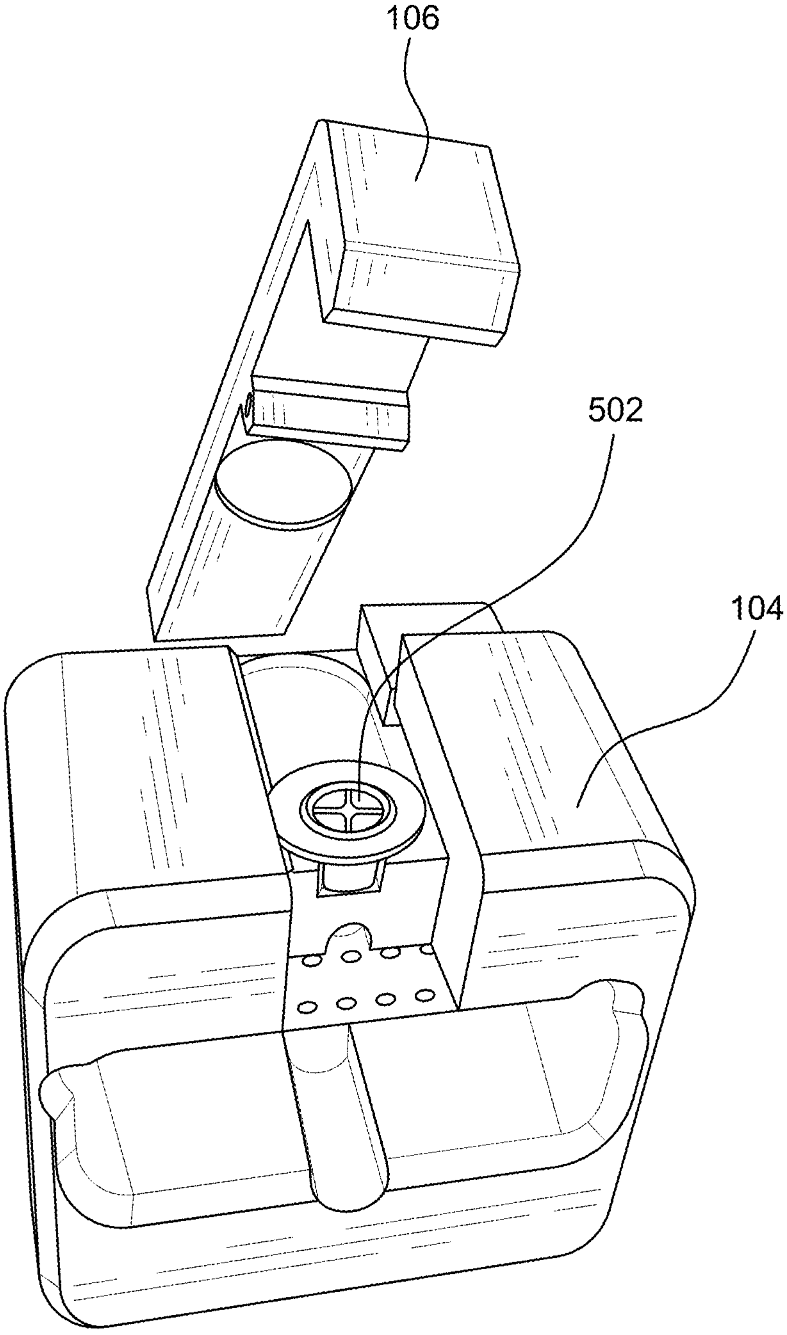
FIG. 5 is a perspective view of a connector head.

FIG. 5 illustrates an example implementation of the connector head 104. The connector head 104 includes a magnet 502 embedded therewithin, such that at least a portion of an inner surface of the latch 106 may interface with the magnet 502. In one example, the magnet 502 engages the engaging end 302 of the latch 106 to maintain a position of the latch 106 in the second position. When the connector head 104 to the connector base 102 are coupled together, the magnet 502 magnetically engages the engaging end 302 of the latch 106 to maintain coupling between the connector base 102 and the connector head 104. The magnet 502 may be a number of different types of magnets, including neodymium magnets, samarium cobalt magnets, alnico magnets, and ferrite magnets.

Figure 6A:
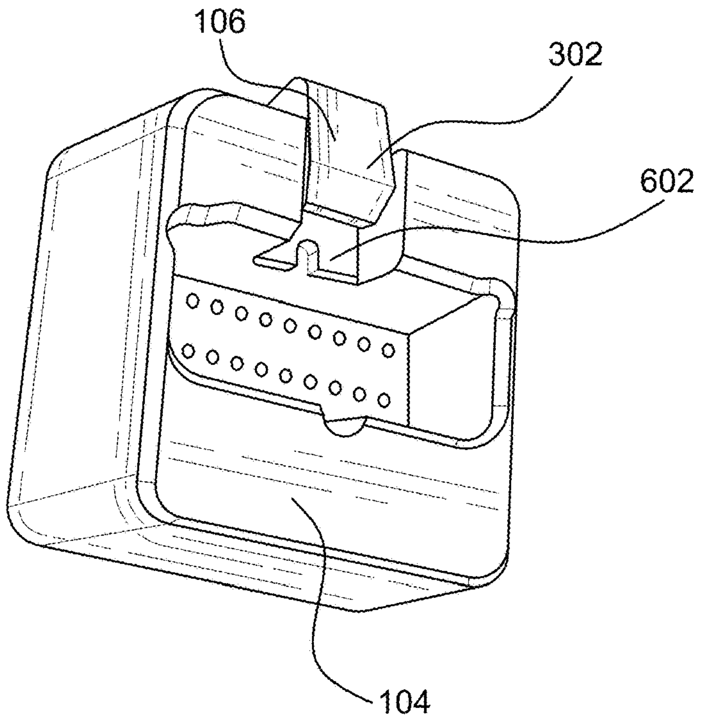
FIG. 6A is a perspective view of the connector head of FIG. 5 in a first state.

FIG. 6A illustrates an example implementation of the connector head 104 having the latch 106 disposed in the first position, in which the engaging end 302 of the latch 106 is raised above an engagement point 602 of the connector head 104. When the latch 106 is in the first position, the magnet 502 is not maintaining magnetic attraction on the engaging end 302 of the latch 106 and not maintaining coupling between the connector head 104 and the connector base 102. Accordingly, when the latch 106 is in the first position, the connector head 104 may be decoupled and/or removed from the connector base 102.

Figure 6B:
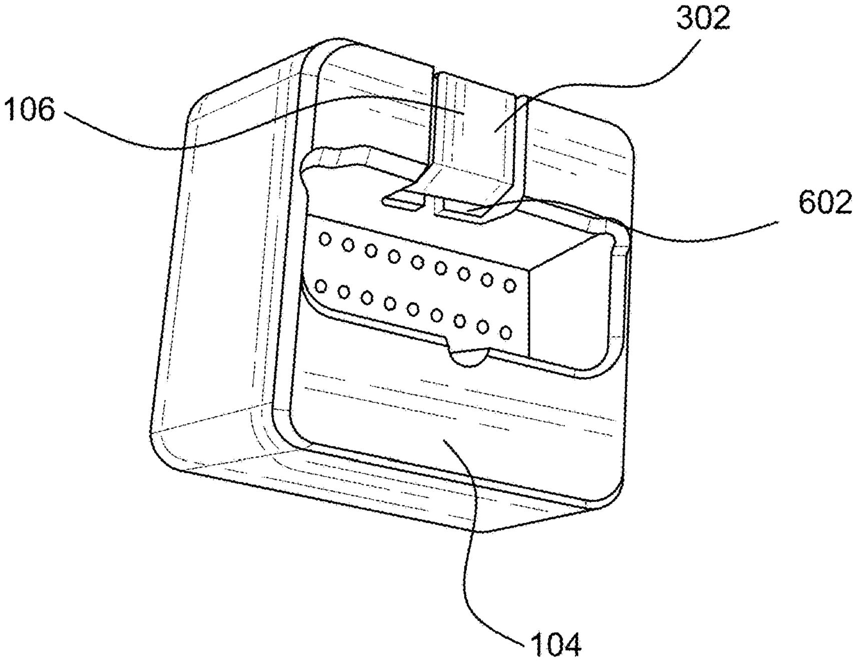
FIG. 6B is a perspective view of the connector head of FIG. 5 in a second state.

FIG. 6B illustrates an example implementation of the connector head 104 having the latch 106 disposed in the second position, in which the engaging end 302 of the latch 106 is engaged with the engagement point 602 of the connector head 104. When the latch 106 is in the second position, the magnet 502 is maintaining magnetic attraction on the engaging end 302 of the latch 106 and maintaining coupling between the connector head 104 and the connector base 102. Accordingly, when the latch 106 is in the second position, the connector head 104 may not be decoupled from and/or may not be removed from the connector base 102.

Figure 7:
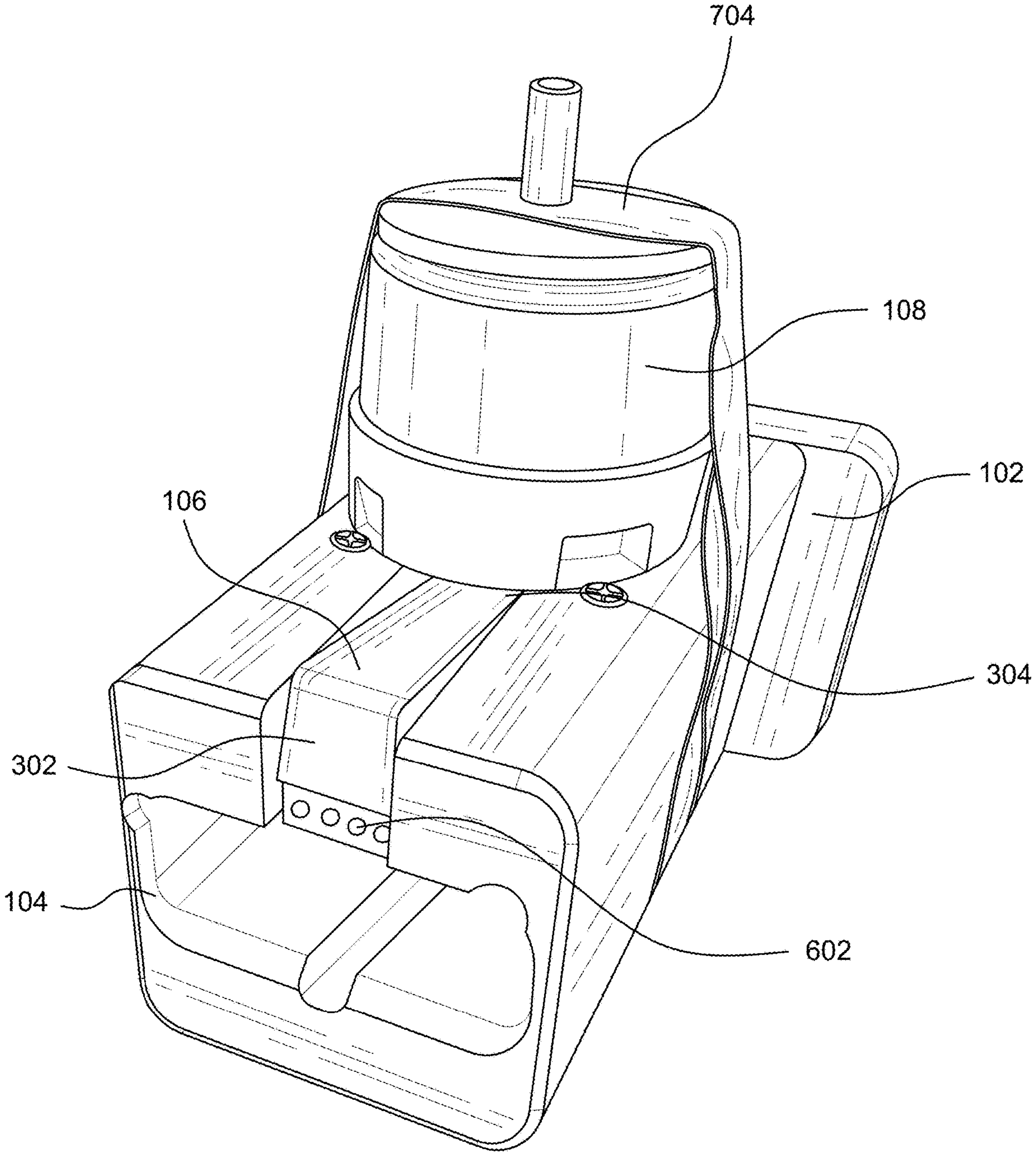
FIG. 7 is a perspective view of the connector system of FIG. 1 in a first state.
Figure 8:
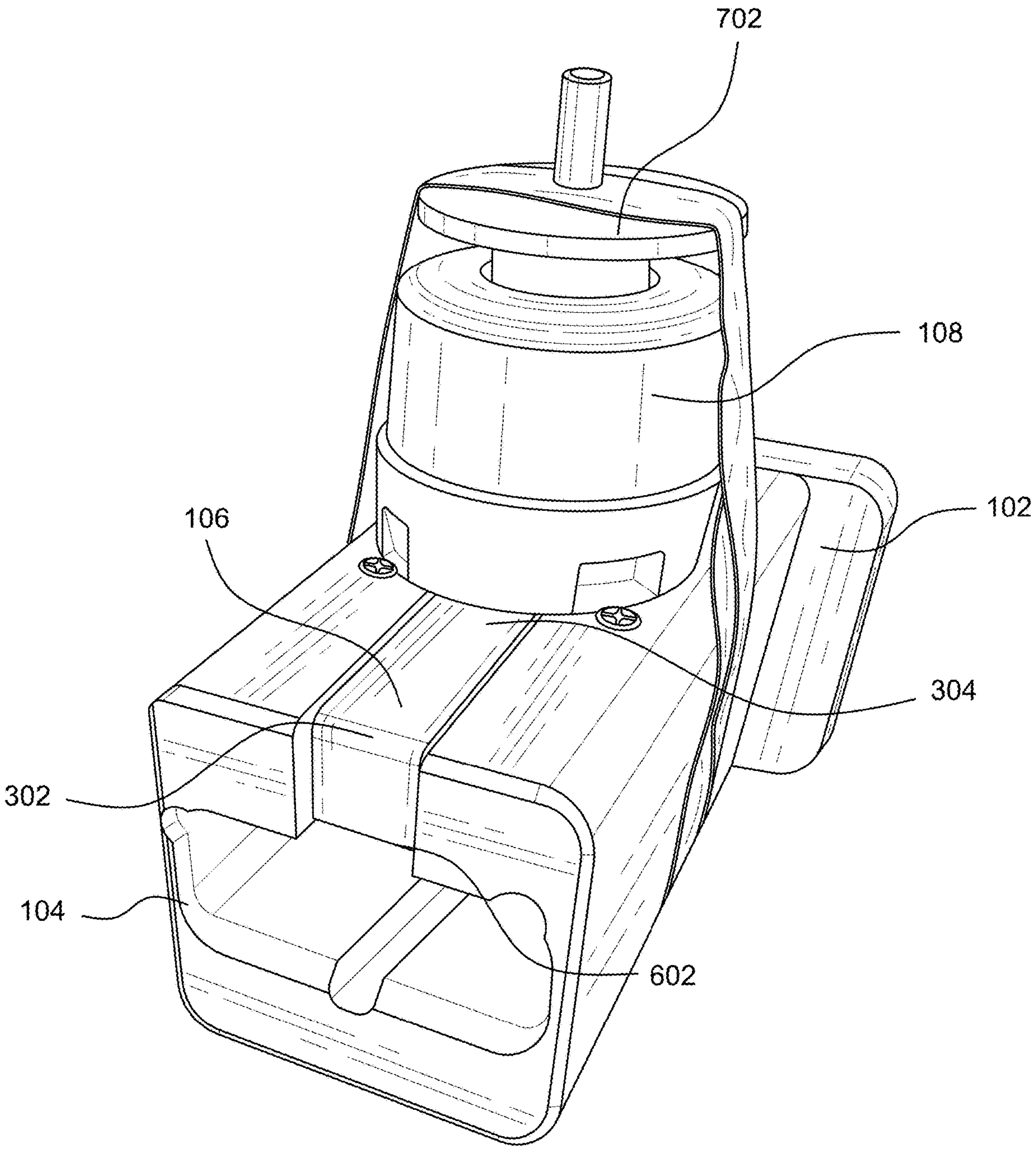
FIG. 8 is a perspective view of the connector system of FIG. 1 in a second state.

FIGS. 7 and 8 illustrate example implementations 700 and 800 of the connector system 100. As illustrated in FIGS. 7 and 8, the solenoid 108 of the connector system 100 includes a plunger 702. In some embodiments, the solenoid 108 may be an electrically actuated solenoid. The plunger 702 may be activated when the solenoid 108 is energized and deactivated when the solenoid 108 is de-energized. In some embodiments, the plunger 702 may be coupled to the solenoid 108 with an enclosure encapsulating the solenoid 108.

As illustrated, for example in FIG. 7, the solenoid 108, when energized, is configured to cause the plunger 702 to be directed downward or lowered. In response to being lowered, the plunger 702 may engage the plunger end 304 of the latch 106 to depress the plunger end 304 into the connector base 102 and to cause the engaging end 302 of the latch 106 to rise above the engagement point 602 of the connector head 104. In this manner, in response to the solenoid 108 being energized, the connector base 102 may be uncoupled, or otherwise separated, from the connector head 104.

Thus, the magnet 502 becomes disengaged from the latch 106 when the connector system 100 is in the first state. In some instances, a first amount of force applied by the plunger 702 onto the plunger end 304 of the latch 106 may be equal to or greater than a second amount of magnetic attraction force provided by the magnet 502 engaged with the engaging end 302 of the latch 106. Put another way, the first amount of force applied by the plunger 702 onto the plunger end 304 of the latch 106 may be sufficient to overcome the second amount of magnetic attraction force provided by the magnet 502, such that the engaging end 302 of the latch 106 becomes separated from the magnet 502 and/or the engagement point 602 of the connector head 104.

As illustrated, for example, in FIG. 8, the solenoid 108, when de-energized, is configured to remove downward force applied onto the plunger 702 by the magnet 502 allowing the plunger 702 to be directed upward or raised. In response to being raised, the plunger 702 may disengage from the plunger end 304 of the latch 106 to stop or cease depressing the plunger end 304 into the connector base 102 and to cause the engaging end 302 of the latch 106 to engage the engagement point 602 of the connector head 104. In this manner, in response to the solenoid 108 being de-energized, the connector base 102 may be coupled to, or otherwise interconnected with, the connector head 104.

When the force applied by the plunger 702 onto the plunger end 304 of the latch 106 becomes less than a second amount of magnetic attraction force provided by the magnet 502 toward the engaging end 302 of the latch 106, the magnet 502 re-engages with the latch 106 and the connector system 100 is then in the second state. Put another way, in response to the first amount of force applied by the plunger 702 onto the plunger end 304 of the latch 106 no longer being sufficient to overcome the second amount of magnetic attraction force provided by the magnet 502, the engaging end 302 of the latch 106 is attracted by the magnet 502 to re-engage with the engagement point 602 of the connector head 104.

Figure 9:
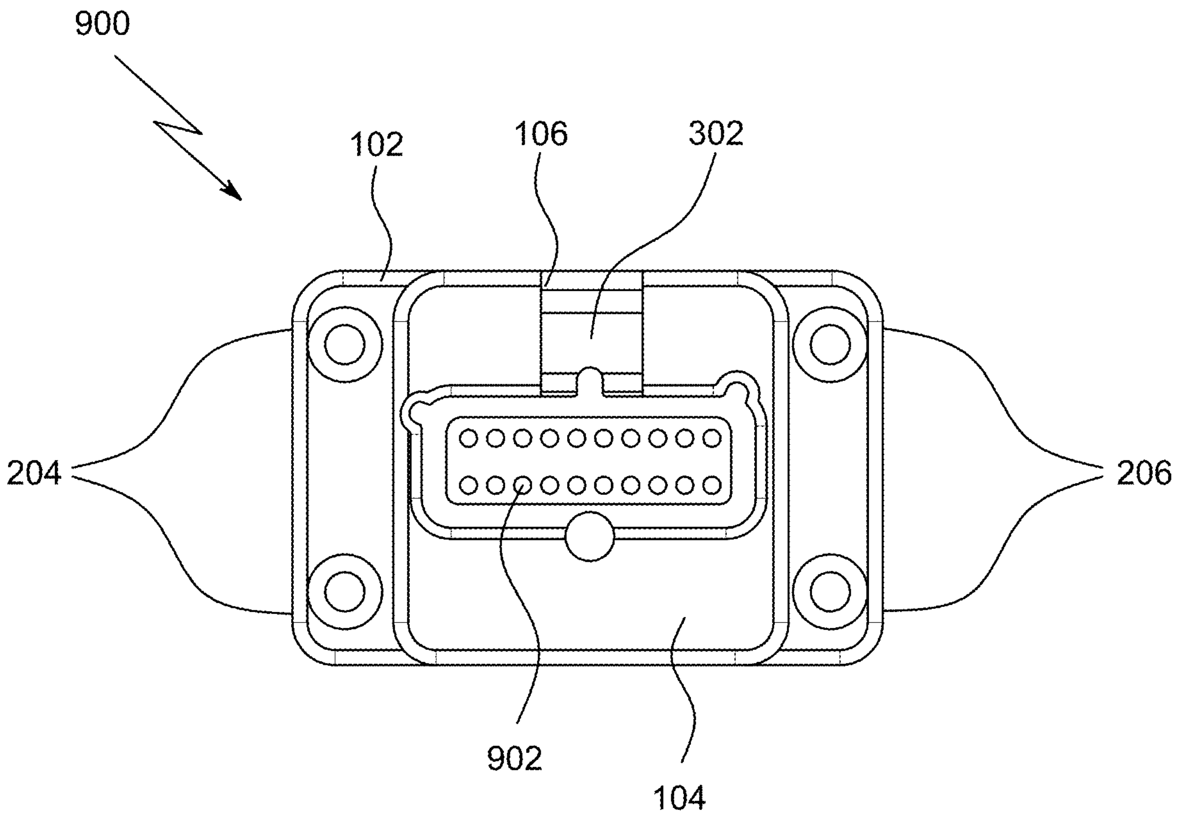
FIG. 9 is a front view of a connector base.

FIG. 9 illustrates a front view 900 of the connector system 100. The engaging end 302 of the latch 106 engages the connector head 104 to couple the connector head 104 and the connector base 102. The connector head 104 may be configured to house a first portion 902 of a multi-pin electrical connector, such as, for example, a plug portion of a 20-pin wiring connector. The connector base 102 may be configured to house a second portion of a same multi-pin electrical connector, such as, for example, a receptor portion of the 20-pin wiring connector. Of course, in other examples, the connector base 102 may house the plug portion of a multi-pin electrical connector and the connector head 104 may house the receptor portion of the multi-pin electrical connector. One or more components (e.g., electrical terminals or pins) of the first portion 902 of the multi-pin electrical connector may be configured to engage one or more components (e.g., nests, seats, or cavities) of the second portion of a same multi-pin electrical connector, such as, for example a receptor portion of the 20-pin wiring connector.

Figure 10A:
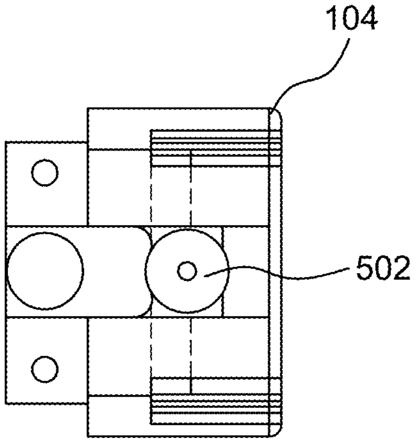
FIG. 10A is a top view of a connector head of FIG. 5.
Figure 10B:
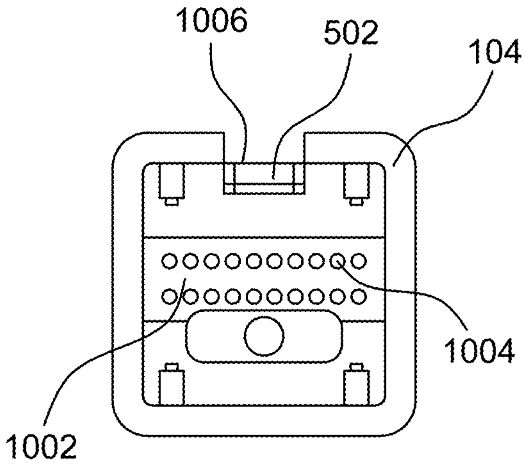
FIG. 10B is a rear view of the connector head of FIG. 5.

FIG. 10A illustrates a top view of the connector head 104 and FIG. 10B illustrates a rear view of the connector head 104. As shown in FIG. 10B, the connector head 104 may include the multi-pin electrical connector (or plug) 1002 having a plurality of pins or prongs 1004 extending outward from a body of the multi-pin electrical connector 1002. The connector base 102 may include a plurality of corresponding nests, seats, cavities, or other receptacles configured to receive at least a portion of the multi-pin electrical connector 1002, e.g., configured to receive one or more of the plurality of prongs 1004. In one example, the connector head 104 defines a recessed channel 1006 configured to receive at least a portion of the latch 106.

Figure 10C:
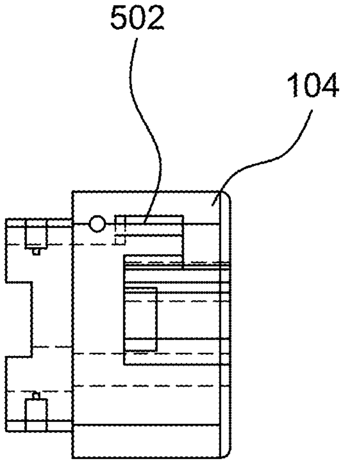
FIG. 10C is a side vide of the connector head of FIG. 5.
Figure 10D:
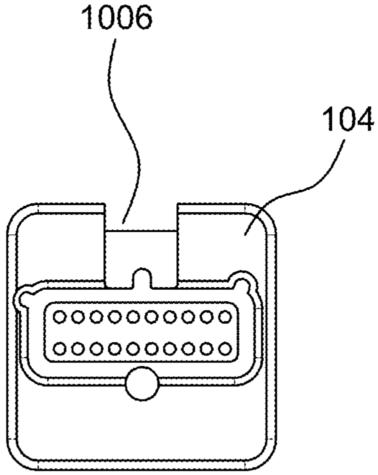
FIG. 10D is a front view of the connector head of FIG. 5.

As illustrated, for example, in FIG. 10C, that shows a side view of the connector head 104, the magnet 502 may be recessed into the connector head 104. FIG. 10D illustrates a front view of the connector head 104 which illustrates the multi-pin electrical connector 1002. The multi-pin electrical connector 1002 is disposed at the second electrical connector end 112 of the connector system 100. The recessed channel 1006 may be configured to receive the latch 106. It is understood that the multi-pin electrical connector 1002 may be a plug of one of a plurality of general purpose or dedicated electrical connectors, such as, but not limited to, an on-board diagnostics (OBD) electrical connector, a vehicle seat sub-assembly connector, a vehicle door sub-assembly connector, and an individual electrical component connector, such as an electrical connector for a motor or a sensor. Likewise, the connector base 102 may be a corresponding receptacle adapted to receive at least a portion of the plug of the multi-pin electrical connector 1002.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," "substantially", "approximately", and "generally" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An electrical connector assembly comprising:

a first electrical connector portion;

a second electrical connector portion configured to be selectively coupled to the first electrical connector portion to establish an electrical connection therebetween;

a latch pivotably coupled to the first electrical connector portion at a pivot point, wherein the first electrical connector portion and the second electrical connector portion are in a locked state when the latch is pivotably positioned to engage at least a portion of the second electrical connector portion, and wherein the first electrical connector portion and the second electrical connector portion are in an unlocked state when the latch is pivotably positioned not to engage the portion of the second electrical connector portion;

a magnet coupled to the first electrical connector portion, wherein the magnet is configured to magnetically engage the latch to cause the latch to maintain a first position; and a solenoid configured to, in response to receiving an electrical control signal, actuate the latch by overcoming the magnetic attraction applied on the latch by the magnet to cause the first electrical connector portion and the second electrical connector portion to be in the unlocked state, wherein the latch includes a latch pivot axis arranged at the pivot point, wherein the latch includes a first longitudinal portion on a first side of the latch pivot axis and a second longitudinal portion on a second side of the latch pivot axis opposite the first side, and wherein the magnet is aligned with and configured to attract the first longitudinal portion of the latch towards the first position to maintain the lock state and the solenoid is configured to engage with the second longitudinal portion of the latch so as to actuate the latch away from the first position to allow the unlocked state.

2. The electrical connector assembly of claim 1 further comprising a first enclosure configured to house the first electrical connector portion and a second enclosure configured to house the second electrical connector portion.

3. The electrical connector assembly of claim 1, wherein the magnet is disposed within the first electrical connector portion.

4. The electrical connector assembly of claim 1, wherein the solenoid is an electrically actuated solenoid.

5. The electrical connector system of claim 1, wherein the at least one of the first and second connector portions includes a recess formed in a top surface of the at least one of the first and second connector portions, and wherein at least a portion of the latch is arranged within the recess when the latch is in the locked state.

6. The electrical connector system of claim 5, wherein, in the locked state, the an outer surface of the latch is flush with the top surface of at least one of the first and second connector portions.

7. The electrical connector system of claim 1, wherein the latch is arranged on an outer side of the first electrical connector portion.

8. The electrical connector system of claim 1, wherein the first portion of the latch extends from a first terminal end of the latch to the latch pivot axis and the second portion of the latch extends from a second terminal end of the latch opposite the first terminal end to the latch pivot axis, wherein the magnet contacts the first portion in the locked state, wherein the solenoid is arranged adjacent to the second portion of the latch so as to engage with the second portion of the latch so as to actuate the latch, and wherein actuation of the latch via the solenoid moves the first portion out of contact with the magnet.

9. The electrical connector system of claim 8, wherein the solenoid is arranged on an outer side of the first electrical connector portion.

10. An electrical connector system comprising:

a first electrical connector portion;

a second electrical connector portion;

a latch configured to lockably join together the first electrical connector portion and the second electrical connector portion to complete an electric circuit therebetween;

a magnet configured to magnetically secure the latch in a predefined position; and a solenoid configured to, in response to receiving an electrical control signal, actuate the latch to overcome magnetic force of the magnet to cause the first electrical connector portion to uncouple from the second electrical connector portion wherein the latch is pivotably coupled to a pivot point of the first electrical connector portion and configured to pivot relative thereto; and wherein the latch includes a latch pivot axis arranged at the pivot point, wherein the latch includes a first longitudinal portion on a first side of the latch pivot axis and a second longitudinal portion on a second side of the latch pivot axis opposite the first side, and wherein the magnet is aligned with and configured to attract the first portion of the latch towards the predefined position to maintain the locked state and the solenoid is aligned with and configured to engage the second portion to move the latch away from the predefined position to allow the unlocked state.

11. The electrical connector system of claim 10, wherein the magnet is disposed within the first electrical connector portion.

12. The electrical connector system of claim 10, wherein the magnet is selected from a list including a neodymium magnet, a samarium cobalt magnet, an alnico magnet, or a ferrite magnet.

13. An electrical connector assembly comprising:

a first electrical connector portion;

a second electrical connector portion configured to be selectively coupled to the first electrical connector portion to establish an electrical connection therebetween, wherein the first electrical connector portion and the second electrical connector portion are in a locked state when coupled together and in an unlocked state when not coupled together;

a latch configured to lockably join together the first electrical connector portion and the second electrical connector portion;

a magnet coupled to the first electrical connector portion, wherein the magnet is configured to apply magnetic attraction to the latch to cause the first electrical connector portion and the second electrical connector portion to maintain the locked state; and a solenoid configured to, in response to receiving an electrical control signal, cause force to be applied to overcome the magnetic attraction applied by the magnet so as to actuate the latch to cause the first electrical connector portion and the second electrical connector portion to be in the unlocked state, wherein the latch is pivotable about a latch pivot axis on the first connector portion, and wherein the magnet is arranged offset from the latch pivot axis along a longitudinal extent of the latch on a first side of the latch, and the solenoid is arranged offset from the latch pivot axis along the longitudinal extent of the latch on a second side of the latch pivot axis opposite the first side.

14. The electrical connector assembly of claim 13 wherein the magnet is configured to magnetically engage the latch to cause the latch to maintain a predefined position.

15. The electrical connector assembly of claim 14, wherein the first electrical connector portion and the second electrical connector portion are in the locked state when the latch is in a latched position and is pivotably positioned to engage at least a portion of the second electrical connector portion, and wherein the first electrical connector portion and the second electrical connector portion are in the unlocked state when the latch is in an unlatched position and is pivotably positioned not to engage the portion of the second electrical connector portion.

16. The electrical connector assembly of claim 14, wherein the solenoid is configured to, in response to receiving an electrical control signal, actuate the latch to overcome magnetic force of the magnet to cause the first electrical connector portion to uncouple from the second electrical connector portion.

17. The electrical connector assembly of claim 13, wherein the magnet includes one of a neodymium magnet, a samarium cobalt magnet, an alnico magnet, or a ferrite magnet.

18. The electrical connector assembly of claim 13, wherein the magnet is disposed within the first electrical connector portion.

* * * * *